United States Patent Office

3,746,744
Patented July 17, 1973

3,746,744
PROCESS FOR THE MANUFACTURE OF ESTERS OF DICARBOXYLIC ACID
John C. Reid, Jr., Wynnewood, Pa., assignor to Atlantic Richfield Company, New York, N.Y.
No Drawing. Filed Mar. 25, 1971, Ser. No. 128,197
Int. Cl. C07c 69/80
U.S. Cl. 260—475 P                    11 Claims

ABSTRACT OF THE DISCLOSURE

A process for producing bis-esters of a dicarboxylic acid by reacting the dicarboxylic acid with an alkylene oxide in the presence of a high molecular weight nitrogen-containing polymer as catalyst.

BACKGROUND OF THE INVENTION

Field of the invention

The present invention relates to a process for the manufacture of bis-esters from the reaction of a dicarboxylic acid with an alkylene oxide.

Description of the prior art

The reaction of alkylene oxides and dicarboxylic acids is known generally. Usually the reaction is conducted in the presence of a solvent and a liquid catalyst. Tertiary amines such as pyridine, triethylamine, tripropylamine, and dimethylaniline have been suggested.

Fujita et al., U.S. 3,397,224, of Aug. 13, 1968 is exemplary. Vaitekunas, U.S. 3,037,049, of May 29, 1962 shows ketones, ethers, and alkylbenzenes as the inert organic liquid solvent medium and tertiary amine catalysts. To achieve high purity bis-esters with the prior art processes, it was necessary to separate the liquid bis-ester from the liquid solvent or liquid catalyst by volatilization using an inert stripping gas or by water washing in a methylene chloride solution. The catalyst and solvent separation steps were not only costly and difficult but they were often inefficient in providing very high purity products.

SUMMARY OF THE INVENTION

It is an object of the present invention to provide a solvent-free process for the preparation of hydroxyalkylesters of dicarboxylic acids. A further object is to provide a novel catalyst for the reaction of an alkylene oxide with dicarboxylic acid for the preparation of high purity bis-esters. A further object is to provide a novel catalyst which is easily and efficiently separated from the bis-ester product and yet is highly efficient. Other objects will be apparent from the following description.

In accordance with the present invention, the direct esterification of a dicarboxylic acid with an alkylene oxide is accomplished by carrying out the reaction in the presence of a high molecular weight nitrogen-containing polymer as catalyst. The catalyst is insoluble in the reaction system and can be separated easily by physical means after completion of the reaction.

DETAILED DESCRIPTION OF THE INVENTION AND DESCRIPTION OF THE PREFERRED EMBODIMENTS

Any high molecular weight polymer containing nitrogen which is insoluble in the reaction system is suitable as the catalyst. Particularly suitable classes of nitrogen-containing polymeric resin catalysts are polyamides, melamine-formaldehyde resins, urea formaldehyde resins, urea formaldehyde resins, and polyurethane resins.

Other types of nitrogen-containing polymeric resins are specifically contemplated.

The catalyst can be in any convenient form such as beads, finely divided, etc., with high surface area per unit weight forms being preferred. The catalyst should not be so finely divided as to make separation difficult. The amount of catalyst may vary from 0.3 to 5 percent by weight based on the dicarboxylic acid. Preferably, 0.5 to 2 weight percent is used.

In the system of this invention the catalyst remains undissolved throughout the reaction; that is to say, the nitrogen-containing high molecular weight polymeric catalyst constitutes a heterogeneous catalyst system for the reaction. This, combined with the lack of solvent in the system, results in a more efficient process for purification of bis-ester product consisting of merely physically separating the nitrogen-containing high molecular weight polymeric catalysts from the liquid bis-ester product by any simple solid-liquid separation procedure such as filtration.

The process of the present invention may be employed in carrying out the condensation of alkylene oxides with various dicarboxylic acids. Aromatic dicarboxylic acids such as phthalic acids, particularly isophthalic acid and terephthalic acid can be employed. Mixtures of these acids can also be used. Other aromatic dicarboxylic acids having one or more alkyl substituents may be employed; for example, methyl isophthalic acid, methyl terephthalic acid, 1-butylphthalic acid, diphenyl dicarboxylic acids and the like. Aliphatic dicarboxylic acids such as adipic, citraconic, fumaric, glutaric, maleic, malonic, oxalic, succinic, tartaric, and the like are suitable.

The alkylene oxide can have from 2 to 14 carbon atoms in the molecule. Various specific oxides include, for example, ethylene oxide, propylene oxide, butylene oxide, isobutylene oxide, 1,2-epoxypentane, and the like. The alkylene oxide can have an aromatic substituent, for example, styrene oxide and the like. Other substituents inert to reaction in this system can be present in the alkylene oxide molecule. The preferred oxide is propylene oxide.

The alkylene oxide employed in the reaction can be added to the mixture of dicarboxylic acid and the nitrogen-containing high molecular weight polymeric catalyst and the entire mixture heated to reaction temperature or the alkylene oxide and acid may be mixed and heated to reaction temperature and the catalyst added thereafter.

In general, a molar excess of alkylene oxide is preferred to form the bis-ester. From about 1 to about 10 equivalents of alkylene oxide per equivalent of dicarboxylic acid is suitable, with the preferred equivalent ratio being from about 2:1 to about 8:1 and most preferred being from about 2:1 to about 6:1.

In the preferred method of preparation of the bis-esters, a large excess of dicarboxylic acid is avoided since such an excess does not desirably affect the yield of product but may lead to undesired color formation and production of side products which are difficult to separate and interfere with the recovery of pure bis-esters.

The condensation reaction is carried out at a temperature of from about 65° to 400° F. depending on the particular reactants employed. The preferred temperature range is from about 200° F. to about 400° F. Preferably, the reaction is carried out under an atmosphere of an inert gas such as nitrogen or the like and under autogenous pressure for the period of time necessary to achieve high conversions and high purity product under the particular temperature and pressure conditions selected. Generally, the reaction is essentially complete within from about 0.5 to about 24 hours. At temperatures in the range of 250° to 300° F. from 1 to 2 hours is usually the optimum time.

Batch, continuous, or semi-continuous processes are suitable since the catalyst is easily reusable. The process is conducted using any liquid-solid separation means for product-recovery, whether a batch, semi-continuous, or continuous process is employed.

The following examples further illustrate the practice of the present invention but are included for exemplary purposes only and are not intended to be construed as a limitation on the invention.

EXAMPLE I

A mixture of 332 grams (2 moles) of isophthalic acid, 456 grams (8 moles) of propylene oxide and 3.3 grams (1 percent by weight based on isophthalic acid) of nylon 66 polyhexamethylene adipamide resin beads (Du Pont Zytel Type 101) were introduced in a one liter autoclave under a nitrogen atmosphere and heated to 300° F. After 132 minutes, 99.8 percent of the isophthalic acid was converted to bis ($\beta$-hydroxypropyl)ester of isophthalic acid. The product had an acid number of 0.5 and a purity of 99 percent. The catalyst was filtered from the product and recovered.

EXAMPLE II

The procedure of Example I was repeated except that instead of nylon 66 as the catalyst, an isobutylated melamineformaldehyde resin was used in the same amount.

This catalyst was prepared by heating isobutanol, melamine, and formaldehyde for 30 minutes at 260° F. to a dry isobutylated melamine-formaldehyde resin which was crushed to a fine powder. After 62 minutes the bis-$\beta$-hydroxypropyl ester of terephthalic acid had an acid number of 0.3 and a purity of 99 percent. 99.1 percent of the terephthalic acid was converted to bis-ester. The catalyst was filtered from the product and recovered.

EXAMPLE III

Isobutylene oxide (8 moles) and adipic acid (2 moles) are reacted for 120 minutes over 1 percent by weight of a finely divided urea-formaldehyde resin catalyst prepared by heating a butylated urea-formaldehyde resin in xylol/butyl alcohol solvent until cured, and then finely dividing the cured polymer.

The catalyst is recovered by simple filtration and the product is bis(hydroxybutyl)adipate.

EXAMPLE IV 1,2-butylene oxide (8 moles) and terephthalic acid (2 moles) are heated over 1 weight percent of a finely divided polyurethane resin as catalyst for 145 minutes at 300° F. to produce bis(hydroxybutyl) terephthalate ester from which the polyurethane catalyst is filtered and recovered.

EXAMPLE V

Eight moles of styrene oxide, 2 moles of isophthalic acid, and 1 weight percent of the nylon 66 bead catalyst as in Example I are heated at 70° F. for 200 minutes to produce bis(hydroxystyryl)isophthalate ester from which the catalyst is filtered and recovered.

EXAMPLE VI 1,2-octylene oxide (5 moles), terephthalic acid (2 moles), and 2 percent by weight of the polyurethane catalyst used in Example IV are heated for 150 minutes at 100° F. to produce bis(hydroxyoctyl)ester.

These examples demonstrate the use of high molecular weight polymers containing nitrogen in a solvent-free process to catalyze the reaction of an alkylene oxide and a dicarboxylic acid to the bis-ester product in high yields and at high purity. The heterogeneous catalyst is easily separated from the reaction product. Various modifications, changes and substitutions in the details should become apparent without departing from the spirit and scope of the invention.

I claim:

1. A process for the preparation of bis(hydroxyalkyl) esters of dicarboxylic acids comprising reacting an aromatic or aliphatic dicarboxylic acid with an alkylene oxide having from two to eight carbon atoms in the molecule at a temperature of from about 65° F. to about 400° F. and a mole ratio of from about 1 to about 10 moles of alkylene oxide per mole of dicarboxylic acid in the presence of a heterogeneous catalyst selected from the group consisting of polyamide resins, polyurethane resins, melamine - formaldehyde resins and urea - formaldehyde resins.

2. The process of claim 1 wherein said dicarboxylic acid is selected from the group consisting of isophthalic acid, terephthalic acid, adipic acid and mixtures thereof.

3. The process of claim 1 wherein the alkylene oxide is selected from the group consisting of propylene oxide, butylene oxide, ethylene oxide, isobutylene oxide, and styrene oxide.

4. The process of claim 1 wherein the catalyst is a polyamide resin.

5. The process of claim 4 wherein the catalyst is present in the weight ratio of 0.005 to about 0.05 based on the weight of the dicarboxylic acid.

6. The process of claim 1 wherein the temperature is from about 200° F. to about 400° F.

7. The process of claim 1 wherein the reaction is carried out under an inert nitrogen atmosphere.

8. A process for the preparation of bis(2-hydroxypropyl)esters of isophthalic acid in high purity and at high yields comprising reacting isophthalic acid and propylene oxide in the presence of from about 0.005 to about 0.02 part of a catalyst selected from the group consisting of polyamide resin, polyurethane resin, and melamine-formaldehyde resin per part of isophthalic acid under an atmosphere of nitrogen at a temperature of from about 200° F. to about 400° F. for a period of from about 60 minutes to about 120 minutes, and thereafter separating said catalyst from said product by filtration.

9. The process of claim 1 wherein said polyamide resin is polyhexamethylene adipamide.

10. The process of claim 8 wherein the catalyst is a polyamide resin.

11. The process of claim 10 wherein said polyamide resin is polyhexamethylene adipamide.

References Cited
UNITED STATES PATENTS

| | | | |
|---|---|---|---|
| 3,340,295 | 9/1967 | Wheeler et al. | 260—486 |
| 3,584,031 | 6/1971 | Martin et al. | 260—475 P |
| 3,280,176 | 10/1966 | Meier et al. | 260—475 P |

LORRAINE A. WEINBERGER, Primary Examiner

E. J. SKELLY, Assistant Examiner

U.S. Cl. X.R.

260—484 B, 485 G